United States Patent
Delacluyse

(10) Patent No.: US 10,141,738 B2
(45) Date of Patent: Nov. 27, 2018

(54) DC POWERED LOCAL POSITIONING SYSTEM

(71) Applicant: Innov8tive LLC, Oklahoma City, OK (US)

(72) Inventor: Gray Delacluyse, Oklahoma City, OK (US)

(73) Assignee: Innov8tive, LLC, Oklahoma City, OK (US)

(*) Notice: Subject to any disclaimer, the term of this patent is extended or adjusted under 35 U.S.C. 154(b) by 52 days.

(21) Appl. No.: 15/152,136

(22) Filed: May 11, 2016

(65) Prior Publication Data

US 2017/0331285 A1    Nov. 16, 2017

(51) Int. Cl.
*H02J 1/00*     (2006.01)
*H04B 1/16*     (2006.01)
*H02M 3/04*     (2006.01)
*H02J 9/06*     (2006.01)

(52) U.S. Cl.
CPC ............... *H02J 1/00* (2013.01); *H02M 3/04* (2013.01); *H04B 1/16* (2013.01); *H02J 9/06* (2013.01)

(58) Field of Classification Search
CPC ..... H02J 7/025; H02J 1/00; H02J 9/06; H04B 1/16; H02M 3/04
See application file for complete search history.

(56) References Cited

U.S. PATENT DOCUMENTS

| | | | |
|---|---|---|---|
| 5,396,062 A | 3/1995 | Eisentraut et al. | |
| 7,761,719 B2 | 7/2010 | Ghoshal et al. | |
| 2007/0258202 A1 | 11/2007 | Cooley et al. | |
| 2013/0002038 A1* | 1/2013 | Lee ........................ | H02J 7/00 307/104 |
| 2014/0172133 A1 | 6/2014 | Snyder | |
| 2015/0260823 A1 | 9/2015 | Hansen | |
| 2015/0341185 A1 | 11/2015 | Keller | |

* cited by examiner

*Primary Examiner* — Robert Deberadinis
(74) *Attorney, Agent, or Firm* — Hall Estill Attorneys at Law; Tyler J. Mantooth

(57) ABSTRACT

A local positioning system can be powered via local and remote direct current sources. The local positioning system may have a power module that selectively activates one, or both, local and remote direct current sources to power a location circuit positioned on a circuit board. The location circuit may attain a position of a user and subsequently transfer that attained position to a remote host via the remote direct current source.

20 Claims, 3 Drawing Sheets

DC POWERED LOCAL POSITIONING SYSTEM

SUMMARY

A local positioning system, in accordance with some embodiments, is powered via local and/or remote direct current sources as directed by a power module. The power module selectively activates one, or both, local and remote direct current sources to power a location circuit positioned on a circuit board. The location circuit may attain a position of a user and subsequently transfer that attained position to a remote host via the remote direct current source.

DETAILED DESCRIPTION

The advent of global positioning systems (GPS) has allowed people to efficiently find their personal location as well as the location of a destination. However, GPS devices generally do not operate well within enclosed buildings, such as shopping malls and other retail environments. That is, a GPS device relying on communication with a satellite to determine global position may not have a requisite resolution to be able to accurately locate a user or guide the user to a destination.

As computing devices have become increasingly mobile with greater wireless computing capabilities, users more frequently utilize a wireless communication means, such as a cellular or wireless network connection, to employ GPS technology. The ability to form short-range secure wireless connections between computing devices has corresponded with the introduction of computing fixtures that can increase the accuracy and performance of indoor user location determining devices.

Figure 1:
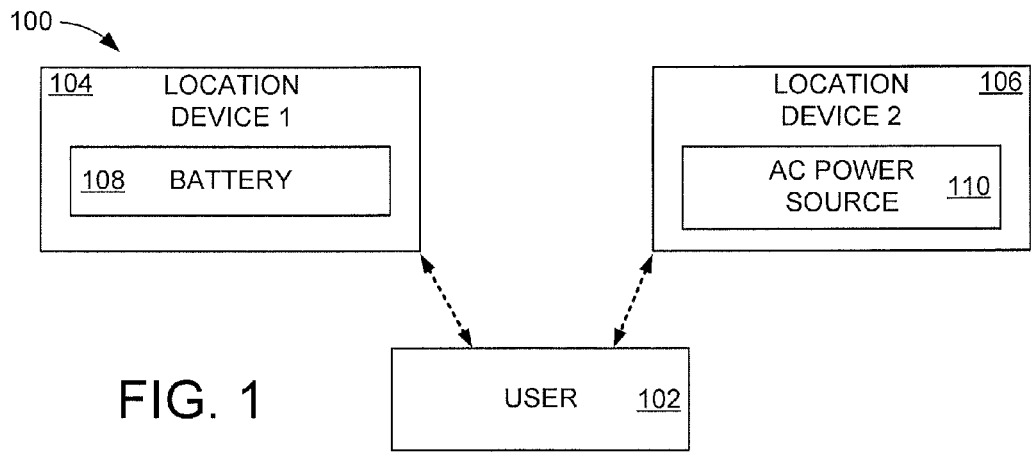
FIG. 1 is a block representation of an example location system arranged in accordance with various embodiments.

FIG. 1 is a block representation of an example location system 100 that can efficiently ascertain the location of a user 102 in an indoor environment. While not limiting, first 104 and second 106 location devices can individually, and collectively, utilize one or more sensors to determine the location of the user 102. For example, the first location device 104 may utilize satellite GPS technology with an optical sensor while the second location device 106 utilizes a connection with the user's computing device to provide independent, or redundant, discovery of the user's location.

The position of the respective location devices 104 and 106 in an indoor environment poses some unique challenges compared to traditional GPS technology in the form of delivery of power. Unlike satellite-based GPS technology, the location devices 104 and 106 need electrical power to operate. Although wind and solar power may be harnessed by the location devices 104 and 106, such power supply can be intermittent and often is not sufficient to consistently operate a location device. Hence, the first location device 104 is powered by a direct current (DC) battery source 108 and the second location device 106 is powered by an alternating current (AC) power source 110.

The supply of DC or AC power to a location device can enable operation of an indoor GPS technology. However, there are a number of different practical disadvantages to supplying power to an indoor, or outdoor, location device via a battery 108 or AC power source 110. For instance, battery maintenance is periodically required and can be overlooked without consistent monitoring of battery power. Also, location devices may be positioned in physical locations that are difficult and/or hazardous to reach, which make changing a battery 108 expensive in terms of labor and system downtime.

By supplying power to a location device with AC power, the device 106 can be susceptible to power surges, the device 106 needs a power inverter to translate power to DC for operation, and a certified electrician is required to install wires and equipment throughout a retail environment. Additionally, a physical network cable connection, such as cat5 or Ethernet data cable, is needed to allow the location device 106 to communicate with a network. It is contemplated that the second location device 106 can utilize a wireless communication means to transmit data to a network host, but such communication means can be hacked, intercepted, and disabled, which may compromise the security of a network. Thus, the supply of DC or AC power to a location device 104 or 106 can be wrought with practical installation and maintenance issues.

Figure 2:
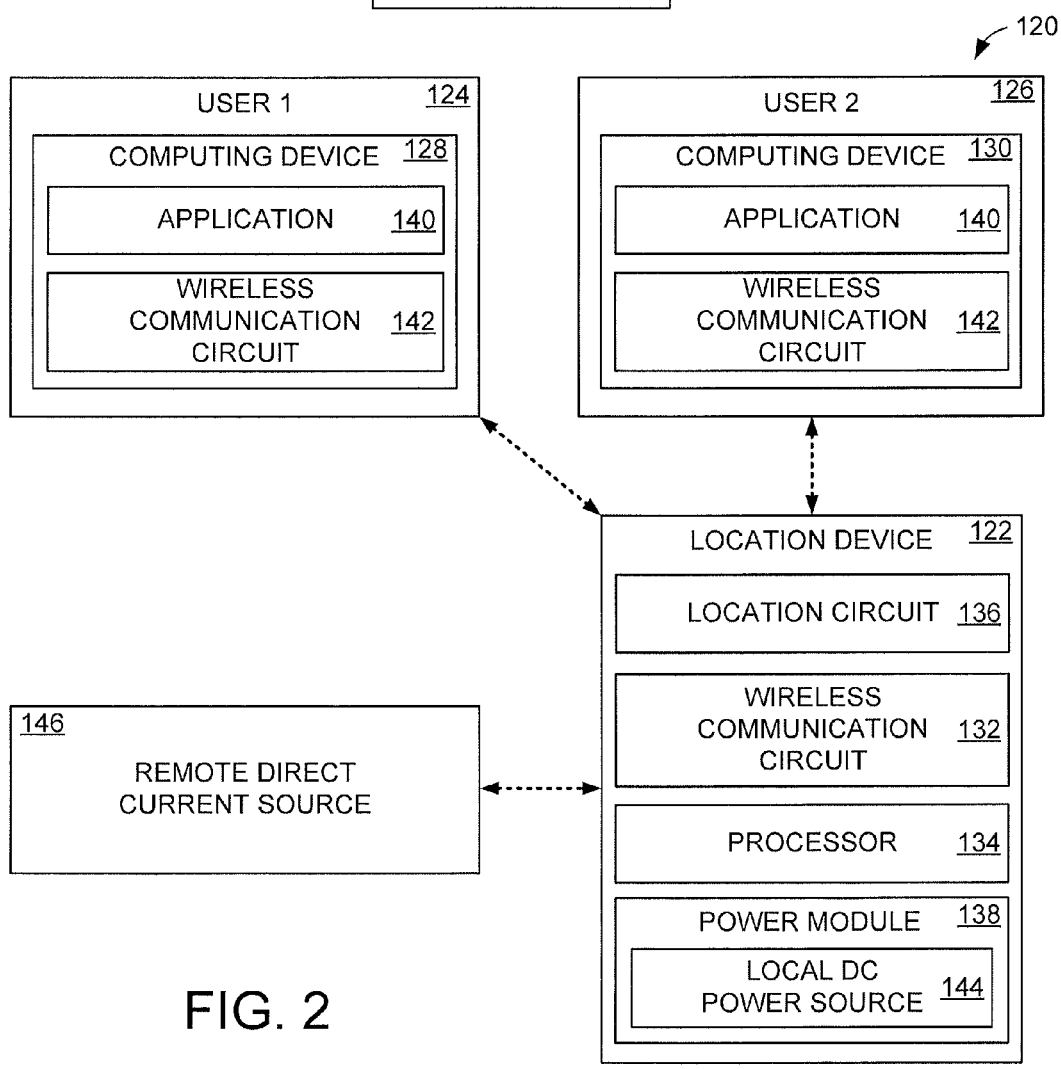
FIG. 2 shows a block representation of an example local positioning system configured in accordance with some embodiments.

Accordingly, the example local positioning system 120 displayed in FIG. 2 is configured to optimize power delivery, installation, and performance of one or more location devices 122. It is initially noted that any number of location devices 122 can be concurrently or independently operated in any indoor or outdoor environment. In the non-limiting example system 120 of FIG. 2, the location device 122 attains the position of at least a first 124 and second 126 user by establishing an intermittent or permanent communication pathway with the users' respective computing devices 128 and 130 via a wireless communication circuit 132.

The location device 122 can employ one or more local processing means, such as a microcontroller, microprocessor, or application specific integrated circuit (ASIC), to operate the wireless communication circuit 132, location circuit 136, and power module 138. The processor 134 may operate in conjunction with at least one software application 140 executed on the respective computing devices 128 and 130 to form one or more wireless connections, such as cellular, radio, or data pathways, between the respective wireless communication circuits 142 of the computing devices 128 and 130 and the communication circuit 132 of the location device 122.

Although the location device 122 can be configured to operate with AC power, assorted embodiments supply DC power to the power module 138 via a combination of local 144 and remote 146 DC sources. The local DC source 144 may be a battery, solar panel, or wind-powered generator while the remote DC source 146 is a wired connection from a network hub. In some embodiments, the remote DC source 146 is a network switch or server that connects to the power module 138 via a network cable comprising both data and power wires. For example, an Ethernet cable having multiple pair of power, ground, and data wires can be utilized to concurrently supply DC power to the power module 138 and transmit data to/from the location device 122.

The combination of local 144 and remote 146 DC power sources allows the power module 138 to select the best power supply to optimize performance of the location device 122. For instance, the power module 144 may utilize the remote source 146 to recharge the local source 144 or may activate the remote source 146 when the location circuit 136 needs more than a default amount of power supplied by the local source 144, such as when more than one user is simultaneously connected to the location device 122.

The ability to optimize power selection and data transmission with the combination of the local 144 and remote 146 power sources is complemented by the ease of installation and maintenance afforded when network cable supplies the remote DC power. In other words, an electrician is not required to install, or modify, the configuration of network cable and supplemental power can extend the life of a local battery source 144 beyond the serviceable life of the location circuit 136, wireless communication circuit 132, and/or processor 134. Therefore, the local 144 and remote 146 DC power sources reduce installation and maintenance requirements while allowing the power module 138 to enhance the performance and security of the location device 122.

Figure 3:
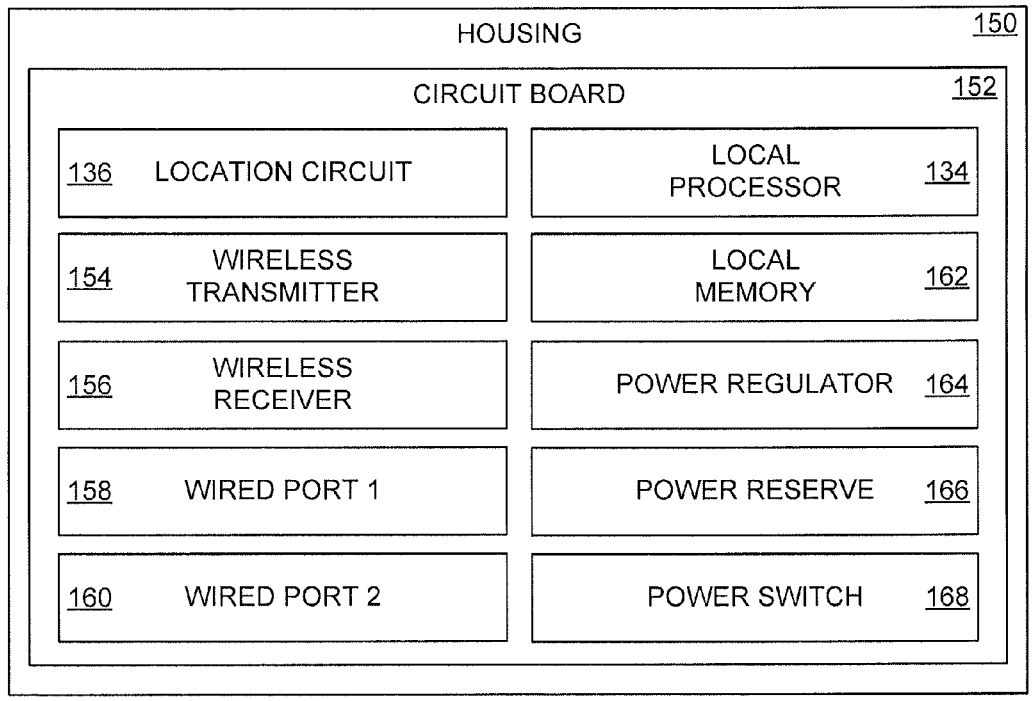
FIG. 3 displays a block representation of a portion of an example location device capable of being employed in the local positioning system of FIG. 2.

FIG. 3 is a block representation of a housing 150 portion of a location device capable of being used in the example local positioning system 120 of FIG. 2. The housing 150 may be any shape and size that is constructed of one or more rigid, semi-rigid, or flexible materials. It is contemplated that the housing 150 can accommodate one or more fasteners, such as a screw, rivet, tape, magnet, or strap, to allow the housing to be affixed in a diverse variety of locations that may be conspicuous or hidden from a user's view. For example, but in no way limiting, the housing 150 may be shaped to fit in a corner of a room, within an advertising portion of a retail shelf, or behind a light fixture.

The housing 150 may be arranged to partially or completely enclose a circuit board 152. It is noted that the housing 150 may be adapted to provide an airtight and/or waterproof seal to protect the circuit board 152. The circuit board 152 may consist of any number of physically connected components that provide electrical interconnects between electrical features. For instance, the circuit board 152 can be constructed as a printed circuit board on which the location circuit 136, local processor 134, power module 138, and wireless communication means are each mounted. It is noted that any electrical aspect of a location device may be physically present in the housing 150 without being physically affixed to the circuit board 152, such as the local DC power source 144.

In accordance with various embodiments, the circuit board 152 comprises at least one wireless transmitter 154 and wireless receiver 156 that can operate concurrently and individually to find, establish, and deactivate one or more different types of wireless signal pathways between the location circuit 136 and any number of different computing devices, such as devices 128 and 130 of FIG. 2. To establish a wired power and/or data signal pathway, the circuit board 152 is equipped with first 158 and second 160 ports. The respective ports 158 and 160 can be similar, or dissimilar, types of interfaces, such as Ethernet, R232, or other serial bus. It is contemplated that the ports 158 and 160 operate to provide concurrent wired connection of different wired cables or to provide input and output interfaces that allow multiple location devices to be connected in series with a network host.

With the wireless and wired inputs, the circuit board 152 can have at least one local memory 162 that can be volatile or non-volatile as well as rotating or solid-state memory to store data generated and transmitted to the location device. The plurality of electrical components may each be configured to operate on DC power, but can operate at different voltages. Hence, the power module portion of the circuit board 152 can comprise at least one power regulator 164 that can alter power supplied by any local or remote DC power source. The power module may further comprise a power reserve 166, such as a capacitor or secondary battery, and a power switch 168 that allow the processor 134 to seamlessly transition between DC power sources without the location circuit 136 losing power, resetting, or dropping an established wireless connection with a user.

Figure 4:
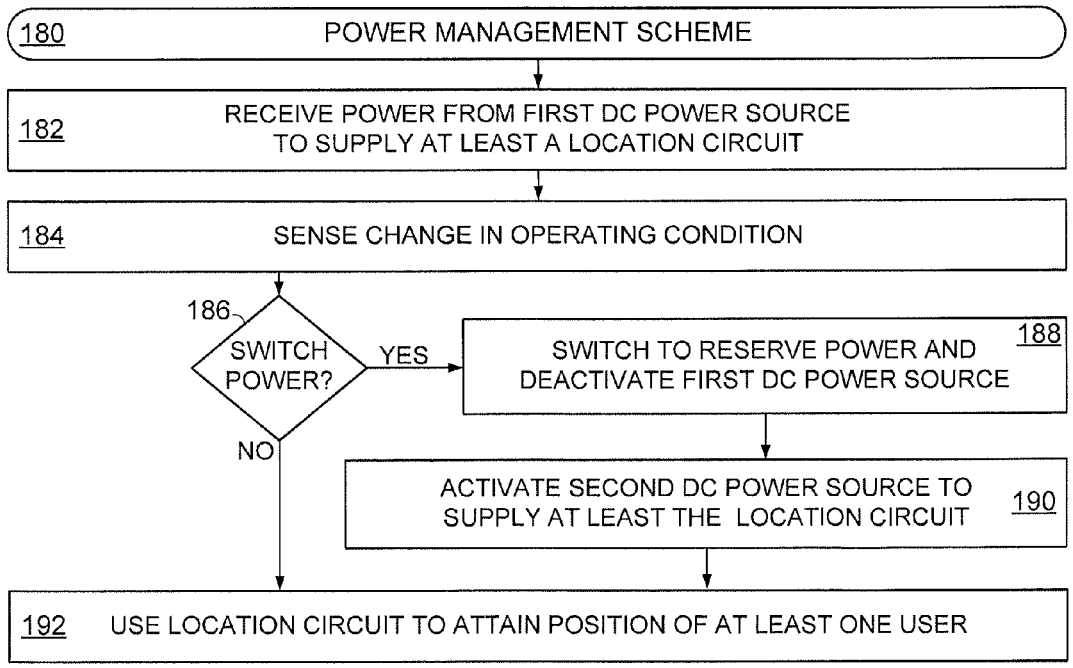
FIG. 4 conveys a flowchart of an example power management scheme that may be executed by the local positioning system of FIGS. 2 and 3.

Through the tuned structure of a local positioning system 120 illustrated in FIGS. 2 and 3, a location device 122 can contain multiple computing, data broadcasting, and power components that optimize the implementation of the location device in an indoor environment, such as a retail store. FIG. 4 conveys an example power management scheme 180 that may be executed by a location device in accordance with various embodiments. The scheme 180 can initially power at least a location circuit portion of a location device in step 182 with power received from a first DC power source, which can be a local or remote DC source.

The first power source may be utilized alone, or in conjunction with more power sources, for any amount of time. When the location device senses a change to one or more operating conditions in step 184, decision 186 can evaluate and determine if the first power source is to be supplemented or replaced with a second power source. It is contemplated that the sensed operating condition may be a local battery output dropping below a voltage output threshold, the battery dropping below a threshold reserve, the location circuit establishing a connection with two or more different users, or preparing to transmit data from the local memory to a remote host. These operating conditions are not exhaustive and the processor can be tuned to intelligently select the local and remote power sources to balance power consumption, such as staying below a 1 mV consumption average, and performance, such as maintaining a 1 ms or less refresh rate on a wireless connection with a user.

In the even decision 186 chooses to switch between power sources, step 188 activates a reserve power source temporarily while the first DC power source is deactivated. Subsequent to step 188, or if decision 186 determines to remain powered by the first DC power source, step 190 activates the second DC power source to supply at least the location circuit portion of the location device. It can be appreciated that the first and second power sources are not limited to a particular type or location, but various embodiment configure the first source as a local battery and the second source as a wired connection to a network host.

Figure 5:
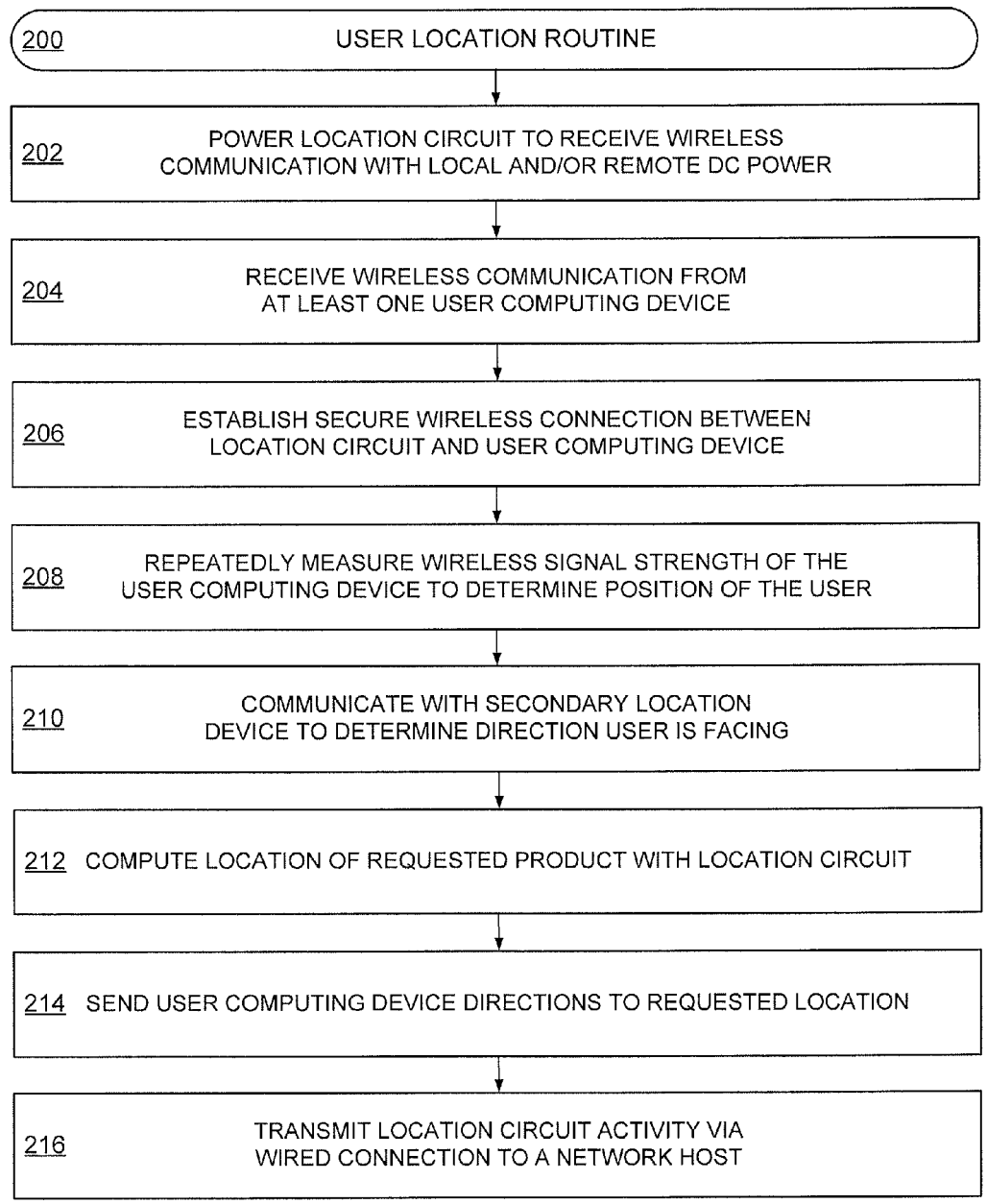
FIG. 5 is an example user location routine carried out in accordance with assorted embodiments.

The ability to selectively activate and deactivate multiple power sources allows a location device to maintain performance and power economy despite changing operating conditions, such as conditions that would quickly drain a location device powered solely by a battery. The selective power management can further optimize the ability of the location device to attain the location of one or more users. FIG. 5 is a flowchart of an example user location routine 200 that can be carried out in accordance with assorted embodiments to identify the location of one or more users in an environment otherwise not compatible with traditional satellite GPS technology.

The routine begins with a location circuit of at least one location device being powered in step 202 by one or more local and/or remote DC sources. It is noted that the location circuit of multiple different location devices can be used independently, in combination, and concurrently on separate users to establish one or more wireless communication pathways. In a non-limiting embodiment, step 202 utilizes different location devices to establish concurrent, but different wireless pathways with a single user computing device, which allows for redundant verification of signal strength that corresponds with the location of the user.

At least one wireless communication pathway established in step 202 is used in step 204 to receive a wireless communication from at least one user computing device. The wireless communication may be maintained as a continuing data stream or may be intermittent to establish a secure wireless connection in step 206 between a location circuit and the user computing device. Although not required, it is contemplated that the secure wireless connection is encrypted and verified by software independently executed on the computing device as a passive or active application and on the location circuit by the local processor.

The secure wireless connection is repeatedly, or continuously, utilized to measure wireless signal strength of the user computing device in step 208, which determines the position of the user relative to the location device. It is noted that multiple location devices can concurrently be used to measure signal strength that is computed by a network host into a location in the environment in which the location devices are affixed. A secondary location device may also be employed in step 210 to determine the direction in which the user is facing. For example, signal strength of multiple different location devices can be compared to determine where the computing device is facing or a sensor, such as the camera or compass, of the computing device can be employed to determine the facing direction.

While it is noted that the position and/or facing direction of the user can be attained without prompting from the user or the application on the user's computing device, the location determining capability of various embodiments can be used to direct a user to a particular location in a store. Such direction can be achieved via the fine resolution afforded by the accurate local positioning system, such as resolution of an inch or less. The accuracy and quickness of tracking a user's position allows step 212 to compute the location of one or more products requested by the user with the location circuit of at least one location circuit.

The location of the requested product(s) can be compared to the current, or last computed, location of the user in step 214 via the location circuit and/or computing device application to direct the user to the requested product location. It is contemplated that the product requests, user locations, walking patterns, and time within an established geofence can be logged by one or more location devices, such as in the local memory of the respective location device(s). The logged user data may be stored locally and/or transmitted in step 216 to a network host, such as a server, via the wired connection of the remote DC power source. Hence, the wired connection of the remote DC power source to the location circuit can be concurrently, or independently, utilized to power the location device and transmit data between a network host and the location device.

It is noted that the various aspects of the user location routine 200, as well as the power management scheme 180 of FIG. 4, are not limited or required. As such, any step or decision can be altered or removed just as anything can be added to the respective scheme 180 and routine 200. For example, steps 212 and 214 can be removed so that logged data can be transmitted in step 216 without a user being directed to one or more retail products.

It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. An apparatus comprising a location circuit powered by a power module, the location circuit and power module mounted on a circuit board within a housing, the power module connected to a remote direct current (DC) source and a local DC source, the remote DC source connected to a network host via a wired connection extending between a wired port and the network host, the network host physically separated from the circuit board and housing.

2. The apparatus of claim 1, wherein the circuit board is housed within a device with the local DC source.

3. The apparatus of claim 2, wherein the device is affixed in a visible location in a retail environment.

4. The apparatus of claim 1, wherein the remote DC source is a network switch connected to the power module by a wired cable comprising at least 2 pairs of wires.

5. The apparatus of claim 1, wherein the local DC source is a battery mounted on the circuit board.

6. The apparatus of claim 1, wherein the power module comprises a secondary wired port.

7. The apparatus of claim 1, wherein at least one wireless receiver is mounted on the circuit board and powered by the power module.

8. The apparatus of claim 1, wherein the power module comprises a DC-DC voltage regulator.

9. A method comprising:
   connecting a power module on a circuit board to a remote direct current (DC) source and a local DC source, the circuit board, power module, and local DC source positioned within a common housing, the remote DC source connected to the power module via a wired cable comprising a data wire and a power wire, the remote DC source physically separated from the power module, circuit board, and local DC source;
   powering a location circuit on the circuit board with the local DC source via the power module;
   deactivating the local DC source in response to a sensed condition; and
   powering the location circuit with the remote DC source.

10. The method of claim 9, wherein the power module recharges the local DC source with the remote DC source.

11. The method of claim 9, wherein the power module monitors a power output of the local DC source and the sensed condition is a drop in power output.

12. The method of claim 9, wherein the remote DC source is connected to the power module via a cable that concurrently transfers power and data.

13. The method of claim 9, wherein the location circuit operates without an alternating current (AC) power source.

14. A method comprising:
   connecting a first power module on a first circuit board to a remote direct current (DC) source and a first local DC source, the first circuit board, first power module, and first local DC source positioned within a common first housing, connecting a second power module on a second circuit board to the remote DC source and a second local DC source, the second circuit board, second power module, and second local DC source positioned within a common second housing, the remote DC source connected to the first power module via a first wired cable and to the second power module via a second wired cable, each wired cable comprising a data wire and a power wire, the remote DC source physically separated from each power module, each circuit board, and each local DC source;

powering a first location circuit on the first circuit board with the first local DC source via the first power module;

powering a second location circuit on the second circuit board with the second local DC source via the second power module;

deactivating the first local DC source in response to a sensed condition;

powering the first location circuit with the remote DC source;

attaining a position of a user via a wireless data connection between the first location circuit, second location circuit, and a computing device of the user; and transferring the position of the user to a remote host via the remote DC source, the position of the user comprising a direction the computing device is facing.

15. The method of claim 14, wherein the sensed condition is a plurality of different users being tracked by the first location circuit and second location circuit.

16. The method of claim 14, wherein the first location circuit attains the position of the user by measuring signal strength from the computing device.

17. The method of claim 14, wherein the first location circuit and second location circuit each establish a secure wireless connection with the computing device in response to the user activating an application executed by the computing device.

18. The method of claim 14, wherein the first location circuit utilizes a global positioning feature of the computing device to confirm the attained position of the user.

19. The method of claim 14, wherein the first location circuit informs the user of a location of a requested retail object via the computing device in response to the direction the computing device is facing.

20. The method of claim 14, wherein the first location circuit attains the position of the user by establishing at least two different wireless connections with the computing device.

* * * * *